United States Patent
Bushnell (10) Patent No.: US 7,324,532 B2
(45) Date of Patent: Jan. 29, 2008

(54) SYSTEM FOR IMPLEMENTING SIMULATED FACILITY GROUPS ON A GR303-TYPE INTERFACE

(75) Inventor: William Jackson Bushnell, St. Charles, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 1066 days.

(21) Appl. No.: 10/359,825

(22) Filed: Feb. 7, 2003

(65) Prior Publication Data

US 2004/0156391 A1   Aug. 12, 2004

(51) Int. Cl.
*H04L 12/56* (2006.01)

(52) U.S. Cl. .................. 370/401; 370/352; 379/88.17

(58) Field of Classification Search ........ 370/352–356, 370/400, 401, 230–238, 466, 467; 709/249, 709/223–225; 379/88.17
See application file for complete search history.

(56) References Cited

U.S. PATENT DOCUMENTS 5,692,126 A * 11/1997 Templeton et al. ......... 709/249

2007/0110043 A1 * 5/2007 Girard ..................... 370/352

* cited by examiner

Primary Examiner—John Pezzlo

(57) ABSTRACT

The Simulated Facility Group System manages a plurality of IP Centrex Groups within a GR303 interface, where each IP Centrex Group is assigned to a unique Simulated Facility Group. A Centrex Feature Gateway interconnects the IP Centrex Access Facilities that serve each IP Centrex Group to a GR303 interface. The Simulated Facility Group System calculates the IP Centrex Access Facility bandwidth requirement of each IP Centrex call set up request, based on a Call Type Parameter received from the Centrex Feature Gateway. On a per call basis, the Simulated Facility Group System checks the available bandwidth on the IP Centrex Access Facility that serves the Centrex Group from which the call originated. The Simulated Facility Group System determines if the call set up request requires a timeslot on the GR303 interface to the central office switch. If a timeslot is required, the Simulated Facility Group System determines if a timeslot is available on the GR303 interface. In addition, the Simulated Facility Group System enables the completion of intra-IP Centrex Group intercom calls without the use of IP Centrex Access Facility bandwidth.

18 Claims, 5 Drawing Sheets

SYSTEM FOR IMPLEMENTING SIMULATED FACILITY GROUPS ON A GR303-TYPE INTERFACE

FIELD OF THE INVENTION

This invention relates to telephone interface circuits that function to interconnect a plurality of telephone subscriber station sets with an IP Centrex switching system.

PROBLEM

It is a problem in telephone communications systems to efficiently provide telephone service to subscribers using shared high speed facilities. Centrex is a central office provided telephone communication service that has evolved from providing a wire-line telephone service to the use of high speed access facilities that enable multiple subscribers to be served via a single shared data transmission facility.

With the classic Centrex system architecture, each telephone station set is provided with a dedicated wire-line loop that physically interconnects the telephone station set to the service provider's Centrex-based central office switch. Consequently, there is no traffic concentration or bottleneck that blocks the origination or termination of telephone calls. However, this arrangement is costly in terms of the physical facilities required to serve the telephone station sets.

Figure 2:
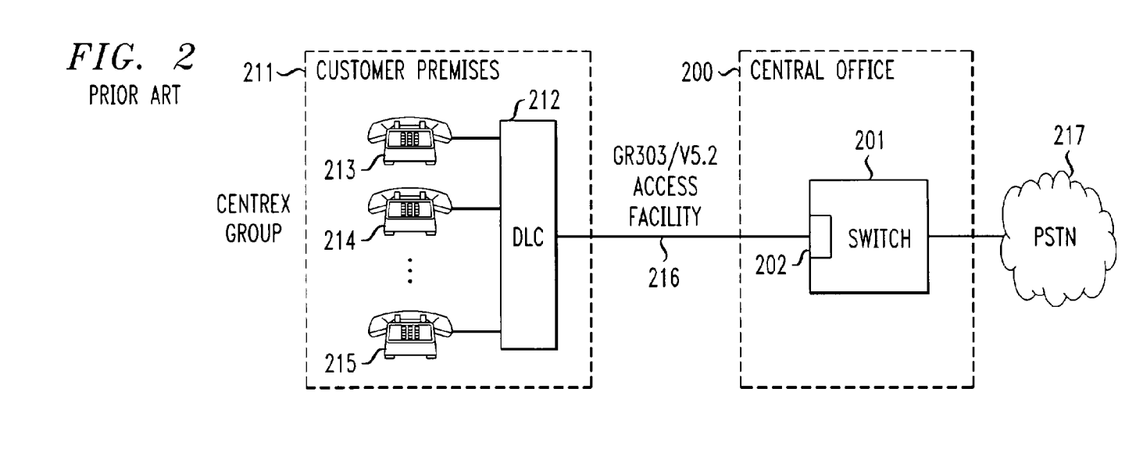
FIG. 2 illustrates the prior art Centrex service architecture using DLC to serve subscriber stations.

In order to reduce the cost of providing service to the subscribers' telephone station sets as shown in FIG. 2, a Centrex Group 211, consisting of a plurality of telephone station sets 213-215, is supported via a premises-based Digital Loop Carrier 212 that is connected to the central office 200 by a high speed access facility 216 that conforms to the GR303 standards. The high speed access facility can consist of one or more DS1 data transmission facilities or E1 data transmission facilities or even higher speed data transmission facilities that serve to connect the Digital Loop Carrier 212 to the central office switch 201 and to the Public Switched Telephone Network 217. The data transmission facility implements a plurality of timeslots and, on a per call basis, the central office switch 201 allocates an available one of the timeslots to the call. This architecture eliminates the need for a dedicated loop from each telephone station set to the central office. The Digital Loop Carrier is typically engineered to provide a 4:1 concentration. This means that the high speed access facility can only support 1 simultaneous call for every 4 telephone station sets in the Centrex Group 211. The central office switch 201 has a concentration subsystem 202 that serves to interface with the high speed access facility 216 that implements the GR303 interface. This concentration subsystem 202 uses a database table that specifies the total number of DSO timeslots on each GR303 access facility 216 that can be used to transport voice calls. When a Centrex user wants to originate or terminate a call, the concentration subsystem 202 checks the busy/idle status of the DSO timeslots on the access facility 216. If there is an idle timeslot, the Digital Loop Carrier 212 is enabled to process the call origination. If there is no idle timeslot available, the call is blocked.

Figure 3:
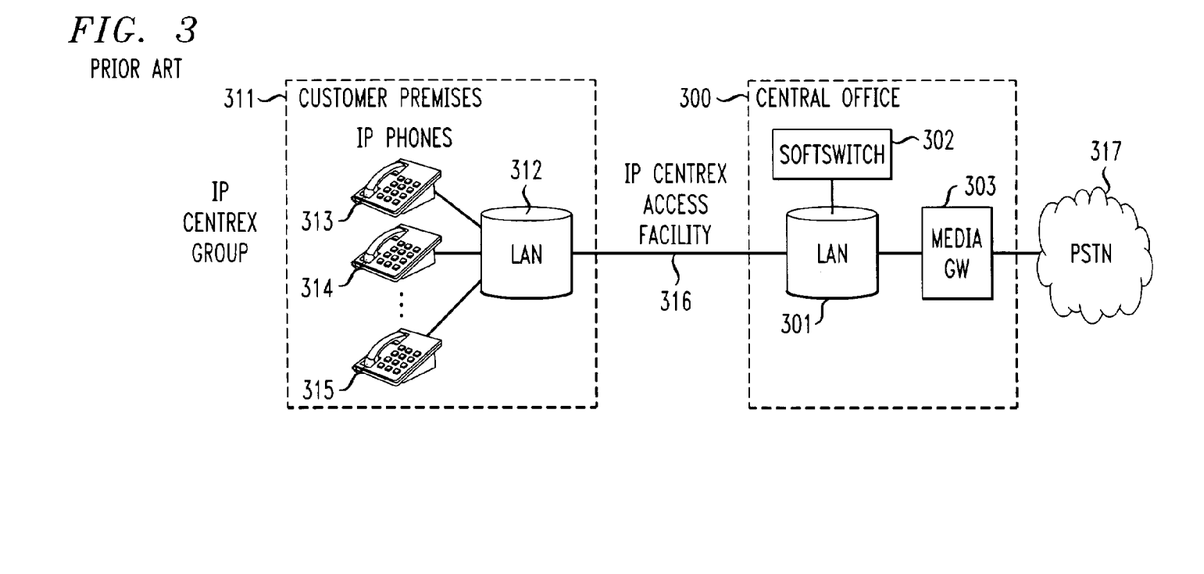
FIG. 3 illustrates the prior art Centrex service architecture using a Softswitch to serve subscriber stations.

An alternative to the use of a Digital Loop Carrier is the provision of IP Centrex, as shown in FIG. 3, where a plurality of IP telephones 313-315 in the Centrex Group 311 is served by a Local Area Network 312. The IP telephones 313-315 share bandwidth on the IP Centrex Access Facility 316 which connects the Local Area Network 312 to the central office 300. The IP telephones 313-315 access advanced Centrex call processing services provided by a Softswitch 302, located in the central office 300, and also access the Public Switched Telephone Network 317 using packet voice Media Gateways 303 that are owned an operated by a service provider. An IP telephone digitizes the subscriber's voice signals and inserts the stream of voice bits into RTP/IP voice packets. These RTP/IP packets are multiplexed on to the customer premises Local Area Network 312 and delivered to the service provider over an IP Centrex Access Facility 316 that is shared across all IP telephones 313-315. To improve IP Centrex economics, the IP Centrex Access Facility 316 can be engineered to concentrate calls. This is analogous to the concentration described above for the GR303 interface. However the IP Centrex Access Facility 316 must be adapted to conform to the unique aspects and implementation of IP Centrex. With IP Centrex, IP telephone sets 313-315 generate streams of RTP/IP packets that transport the bearer or digitized voice. The length and frequency of these packets vary depending on the IP telephone configuration and the types of service. As the length and frequency of the packets vary, the bandwidth for the call varies. With packet voice calls, the IP telephones 313-315 and the Softswitch 302 exchange call set up signaling messages, which specify the voice bit rate (e.g.: compression or silence suppression and the sample rates). These parameters can be used to calculate the bits per second or facility bandwidth required for the call. The routers at each end of the facility statistically multiplex the RTP/IP packet voice streams. During periods of minor congestion on the facility, packets are queued by the routers. This queuing introduces delay in the delivery of the packets. Since voice is a real time service with tight delay requirements, excessive queuing delays result in degradation of voice quality. As the congestion increases, the packet buffers in the routers can overflow and packets can be discarded. This can lead to severe voice quality degradation and when these situations arise, all of the calls in progress suffer degraded quality. Consequently, there must be a mechanism to limit the initiation of additional calls when the facility capacity is exhausted. The call initiation throttling mechanism is referred to as Call Admission Control, which is well known in the art, and which is located in the Softswitch 302. With Call Admission Control, the maximum number of simultaneous packet voice sessions supported by the IP Centrex Access Facility 316 is limited to the capacity of the access facility. If there is available bandwidth, the Local Area Network 312 is enabled to process the call origination. If there is no additional capacity available, the call is blocked.

Another aspect of IP Centrex is the manner in which intercom calls are processed. An intercom call originates and terminates within the same IP Centrex Group 311. Some IP Centrex systems can process an intercom call without using any bandwidth on the IP Centrex Access Facility 316. The RTP/IP packets are transported over the premises Local Area Network 312 and do not use the IP Centrex Access Facility 316. However, other types of IP Centrex systems require that all RTP/IP packets be passed over the IP Centrex Access Facility 316 between the customer's premises and the central office 300 of the service provider. With these systems, an intercom call uses the bandwidth normally used by two incoming or outgoing calls.

Figure 4:
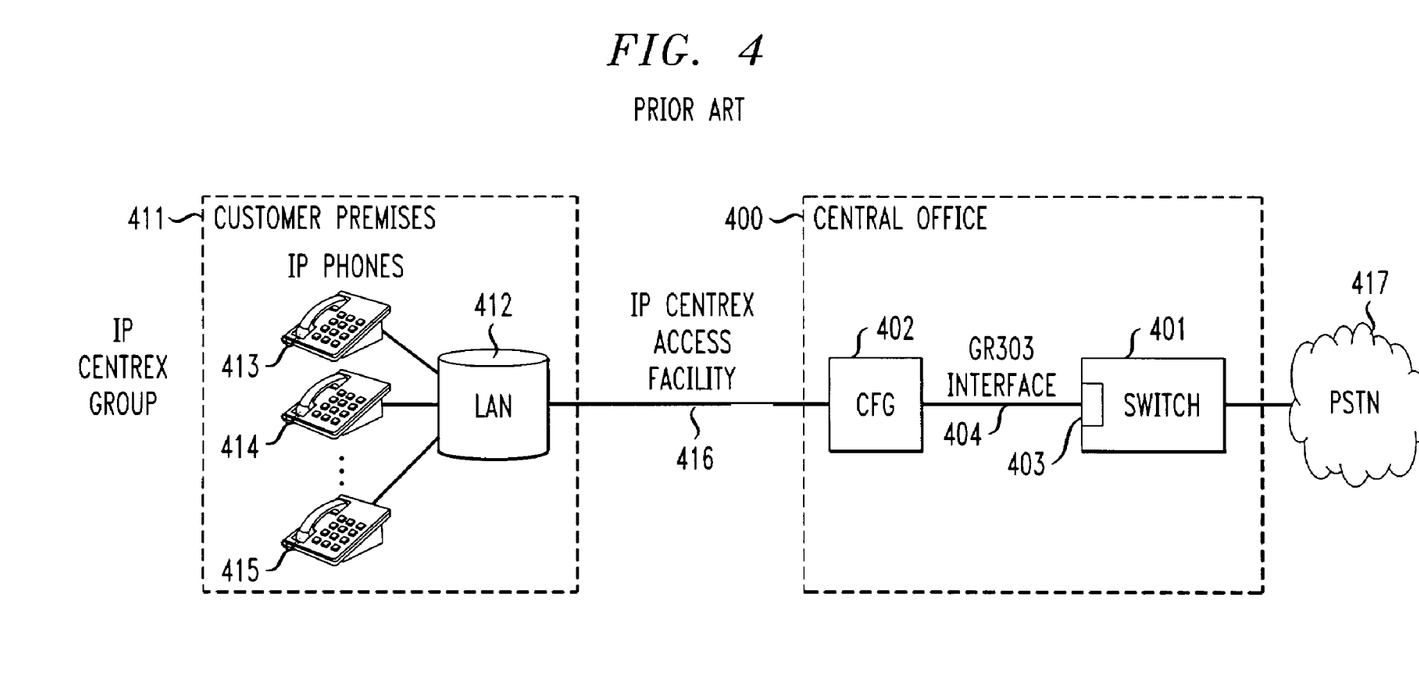
FIG. 4 illustrates the prior art Centrex service architecture using a Centrex Feature gateway to serve subscriber stations.

An alternative IP Centrex implementation, shown in FIG. 4, uses a Centrex Feature Gateway 402 that supports IP telephones 413-415 in an IP Centrex Group 411 using a GR303 interface 404 to existing central office circuit switches 401. With this system, the RTP/IP packets are concentrated onto an IP Centrex Access Facility 416 and transmitted to the IP Centrex Feature Gateway 402, located in the central office 400. The IP Centrex Feature Gateway 402 converts the RTP/IP packets into DS0 timeslots and it converts the IP Centrex signaling messages (H.323, SIP, etc.) into GR303 signaling messages. However, there are presently no special software algorithms to support concentration on the IP Centrex Access Facility 416 connected to the IP Centrex Feature Gateway 402. It is possible to support IP Centrex Access Facility concentration by providing corresponding a concentration subsystem 403 on the GR303 interface 404. Under this arrangement, the IP Centrex Access Facility 416 capacity in terms of the total number of simultaneous RTP/IP streams must be greater than the total number of simultaneous calls supported on the GR303 interface 404 to the central office switch 401. In this configuration, the GR303 concentration subsystem 403 blocks excess call attempts before the IP Centrex Access Facility 416 is overloaded. This arrangement has several drawbacks. It does not allow the Centrex Feature Gateway 402 to support multiple IP Centrex groups 411 in which each group has a separate concentrated IP Centrex Access Facility. It does not recognize that intercom calls between IP telephones 413-415 do not require capacity of the IP Centrex Access Facility 416.

Thus, existing IP Centrex systems, using a GR303 interface to the central office switch fail to provide service to multiple Centrex Groups and waste access facility bandwidth by failing to enable the processing of intercom calls within the Centrex Group. In addition, these systems fail to adequately manage the bandwidth requirements of the calls that are served by the IP Centrex Access Facility.

SOLUTION

The above-described problems are solved and a technical advance achieved by the present system for implementing simulated facility groups on a GR303-type interface (or the V5.2-type interface which is an international version of a GR303-type interface), termed "Simulated Facility Group System" herein. The Simulated Facility Group System manages a plurality of IP Centrex Groups within a GR303 interface, where each IP Centrex Group is assigned to a unique Simulated Facility Group. A Centrex Feature Gateway interconnects the IP Centex Access Facilities that serve each IP Centrex Group to a GR303 interface. The Simulated Facility Group System calculates the IP Centrex Access Facility bandwidth requirement of each IP Centrex call set up request, based on a Call Type Parameter received from the Centrex Feature Gateway. On a per call basis, the Simulated Facility Group System checks the available bandwidth on the IP Centex Access Facility that serves the Centrex Group from which the call originated. The Simulated Facility Group System determines if the call set up request requires a timeslot on the GR303 interface to the central office switch. If a timeslot is required, the Simulated Facility Group System determines if a timeslot is available on the GR303 interface. In addition, the Simulated Facility Group System enables the completion of intra-IP Centrex Group intercom calls without the use of IP Centrex Access Facility bandwidth.

DETAILED DESCRIPTION

Figure 1:
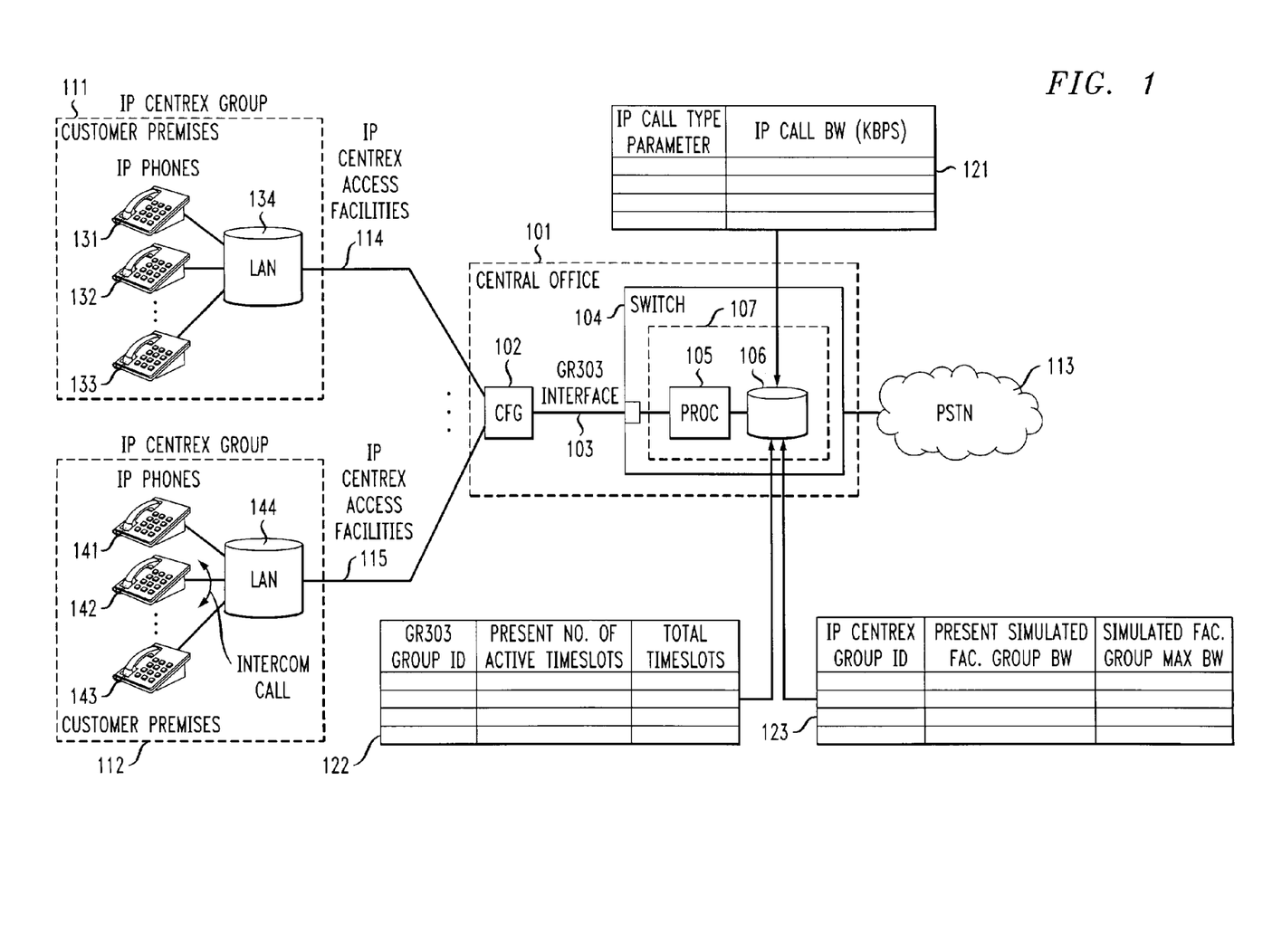
FIG. 1 illustrates in block diagram form the overall architecture of the present Simulated Facility Group System and an environment in which it is operational.

FIG. 1 illustrates in block diagram form the overall architecture of the present Simulated Facility Group System 107 and an environment in which it is operational. As shown in FIG. 1, the Simulated Facility Group System 107 manages a plurality of IP Centrex Groups 111, 112 within a GR303 interface 103, where the IP Centrex Groups 111, 112 and their associated IP Centrex Access Facilities 114, 115 are assigned to a Simulated Facility Group. A Centrex Feature Gateway 102 interconnects the IP Centrex Access Facilities 114, 115 that serve each IP Centrex Group 111, 112 to a GR303 interface 103 and thence through the central office switch 104 to the Public Switched Telephone Network 113. The Centrex Feature Gateway 102 converts packet voice received from the IP Access Facilities 114, 115 to GR303 interface data format for transmission to the central office switch 104. In addition, the Centrex Feature Gateway 102 multiplexes multiple IP Access Facilities 114, 115 to a single GR303 interface 103. The Centrex Groups 111, 112 each contain a plurality of IP telephones 131-133, 141-143 that are interconnected via a Local Area Network 134, 144 at the customer premises. The Simulated Facility Group System 107 includes a processor 105 and a database 106. The database 106 contains data tables that record the bandwidth capacity of each IP Centrex Access Facility 114, 115 as well as the GR303 interface 103. The IP Call Type Parameter Table 121 lists the correspondence between IP call types, as indicated by the IP Call Type Parameter generated by the Centrex Feature Gateway 102, and the bandwidth in Kilobytes per second (KBPS) required to serve this call type, for each of the Centrex IP Groups 111, 112. This table also specifies the bandwidth requirements for each type of IP Centrex voice compression and silence suppression supported by the IP Centrex Feature Gateway 102. Thus, the effective bandwidth usage for each call can be computed to simulate the load placed on the IP Access Facilities 114, 115 by each call. The Facility Group Bandwidth Table 123 contains data that indicates the correspondence among the IP Centrex Groups and the associated Present Simulated Facility Group Bandwidth and the associated Simulated Facility Group Maximum Bandwidth. This table thereby indicates the present simulated load on the identified IP Centrex Access Facility by the presently active calls and the maximum load that can be served by the identified IP Centrex Access Facility. It is assumed that the central office switch 104 also contains the typical data tables for the GR303 concentration software algorithm. The GR303 Timeslot Management Table 122 specifies the maximum number of timeslots provisioned on the GR303 facility and the number of timeslots that are presently active. In addition, the GR303 interface software on the IP Centrex Feature Gateway 102 and the central office switch 104 is enhanced to pass the IP Centrex Call Type requirements on each call. This can be implemented by expanding the call type parameter in the call set up message in the GR303 message set.

The Simulated Facility Group System 107 calculates the IP Centrex Access Facility bandwidth requirement of each IP Centrex call set up request, based on a Call Type Parameter received from the Centrex Feature Gateway. On a per call basis, the Simulated Facility Group System checks the available bandwidth on the IP Centex Access Facility that serves the Centrex Group from which the call originated. The Simulated Facility Group System determines if the call set up request requires a timeslot on the GR303 interface to the central office switch. If a timeslot is required, the Simulated Facility Group System determines if a timeslot is available on the GR303 interface. In addition, the Simulated Facility Group System enables the completion of intra-IP Centrex Group intercom calls without the use of IP Centrex Access Facility bandwidth. Thus, the Simulated Facilities Group System 107 manages call originations and call terminations based on the simulated loads computed for the presently active calls, to ensure that the capacity of each IP Centrex Access Facility 114, 115 and the capacity of the GR303 interface 103 are not exceeded.

Simulated Facility Group System Call Setup

Figure 5:
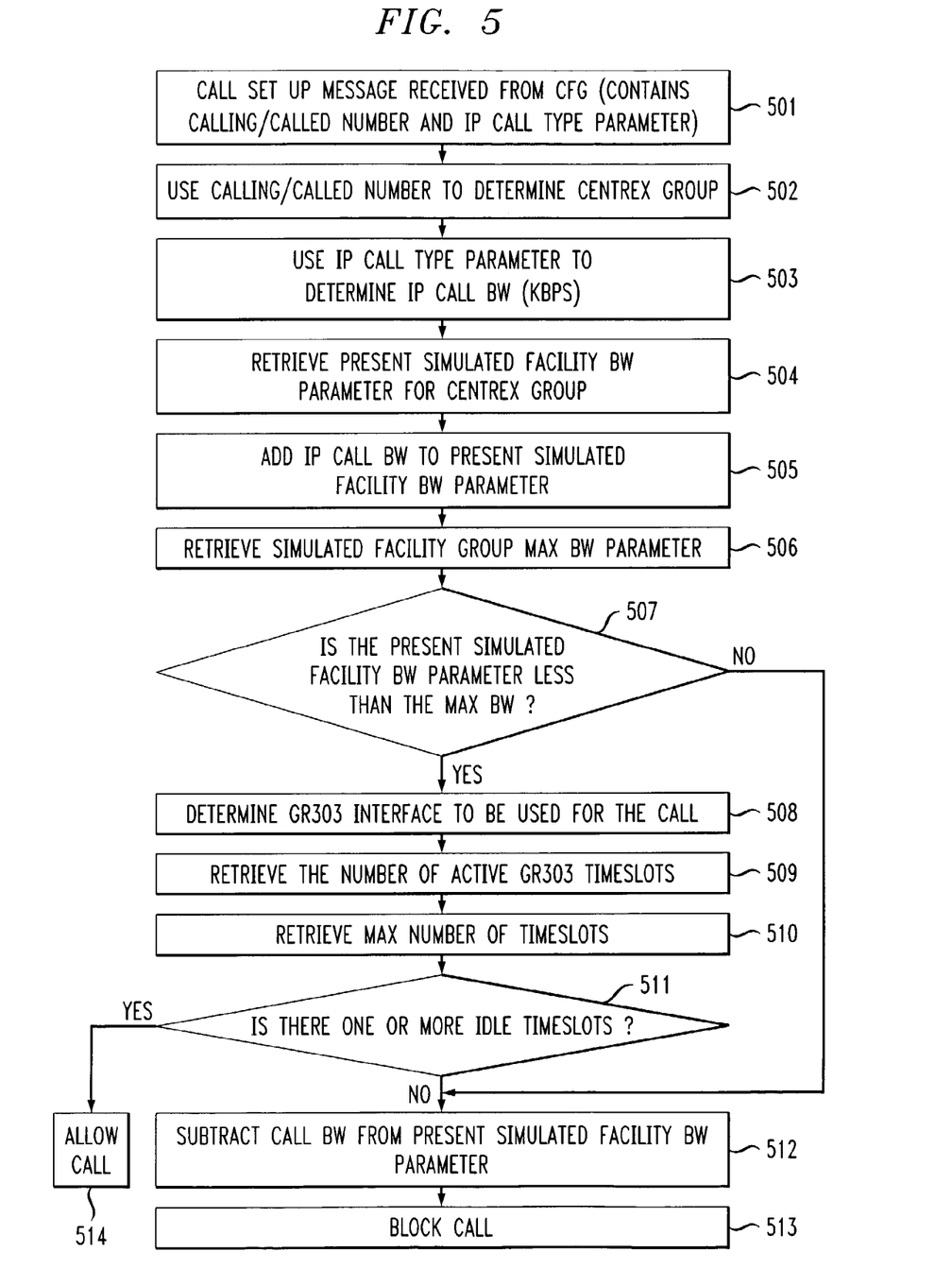
FIG. 5 illustrates in flow diagram form the operation of the present Simulated Facility Group System in a call setup mode.

FIG. 5 illustrates in flow diagram form the operation of the present Simulated Facility Group System in a call setup mode. At step 501, the Simulated Facility Group System 107 receives a call setup message from the Centrex Feature Gateway 102, wherein the call setup message contains the calling/called number and the IP call type parameter. The Simulated Facility Group System 107 at step 502 uses the calling/called number to identify the Centrex Group 111 that serves the calling/called party by retrieving data from a Centrex Group lookup table that identifies members of each Centrex Group, and at step 503 uses the IP Call Type Parameter to determine the bandwidth required to serve this call. This data is maintained in the IP Call Type Parameter Table 121 which lists the correspondence between IP call types and the bandwidth required to serve this call type, for each of the Centrex IP Groups 111, 112. At step 504, the Simulated Facility Group System 107 retrieves from the Present Simulated Facility Group Bandwidth table 123, the present Simulated Facility Group Bandwidth for the assigned Centrex Group 111. The Simulated Facility Group System 107 then adds this IP Call bandwidth at step 505 to the Present Simulated Facility bandwidth for the assigned Centrex Group 111, as defined by an entry in the Facility Group Bandwidth Table 123. The Simulated Facility maximum bandwidth parameter for the assigned Centrex Group 111 is then retrieved from the Facility Group Bandwidth Table 123 by the Simulated Facility Group System 107 at step 506. At step 507, the Simulated Facility Group System 107 compares the present Simulated Facility bandwidth parameter for the assigned Centrex Group 111 with the Simulated Facility maximum bandwidth parameter for the assigned Centrex Group 111 to determine whether the maximum bandwidth is exceeded. If it is, then the Simulated Facility Group System 107 at step 512 subtracts this IP Call bandwidth from the present Simulated Facility bandwidth parameter for the assigned Centrex Group 111 and blocks the call at step 513.

If the maximum bandwidth is not exceeded, as determined at step 507, then processing advances to step 508, where the Simulated Facility Group System 107 determines which GR303 interface 103 serves this call. Data indicative of the number of active timeslots in the GR303 interface 103 is retrieved from the GR303 Timeslot Management Table 122 by the Simulated Facility Group System 107 at step 509 and at step 510 the Simulated Facility Group System 107 determines whether an idle timeslot is available in this GR303 interface 103. If there are no available timeslots, then processing advances to steps 512 and 513, as described above. If there are available timeslots, then processing advances to step 514, where the Simulated Facility Group System 107 enables this call to be completed and the timeslot availability data in the GR303 Timeslot Management Table 122 is updated to reflect this call completion.

Simulated Facility Group System Call Termination

Figure 6:
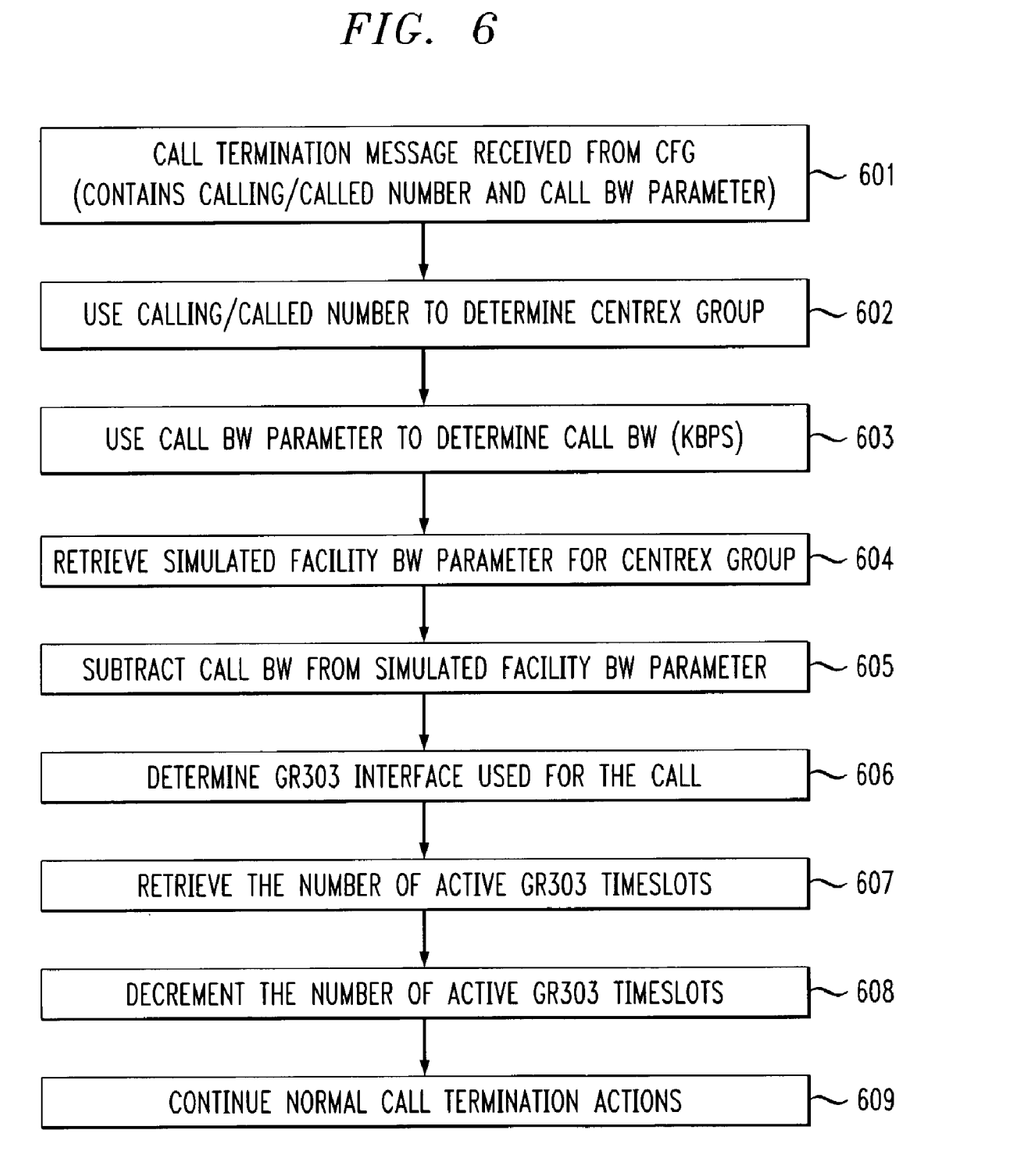
FIG. 6 illustrates in flow diagram form the operation of the present Simulated Facility Group System in a call termination mode.

FIG. 6 illustrates in flow diagram form the operation of the present Simulated Facility Group System in a call termination mode. At step 601, the Simulated Facility Group System 107 receives a call termination message from the Centrex Feature Gateway 102, wherein the call setup message contains the calling/called number and the IP call type parameter. The Simulated Facility Group System 107 at step 602 uses the calling/called number to identify the Centrex Group 111 that serves the calling/called party and at step 603 uses the IP Call Type Parameter to determine the bandwidth, as defined by an entry in the IP Call Type Parameter Table 121, required to serve this call. At step 604, the Simulated Facility Group System 107 retrieves from the Facility Group Bandwidth Table 123 the present Simulated Facility bandwidth parameter for the assigned Centrex Group 111. The Simulated Facility Group System 107 subtracts this IP Call bandwidth at step 605 from the Simulated Facility bandwidth parameter for the assigned Centrex Group 111 and updates the corresponding data stored in the Facility Group Bandwidth Table 123.

At step 606, the Simulated Facility Group System 107 determines the GR303 interface 103 that serves this call. The number of active timeslots in the GR303 interface is retrieved from the GR303 Timeslot Management Table 122 by the Simulated Facility Group System 107 at step 607 and at step 608 the Simulated Facility Group System 107 decrements the number of active timeslots in the GR303 interface 103 to update the timeslot availability data in the GR303 Timeslot Management Table 122. The call termination process is executed at step 609 by the Simulated Facility Group System 107.

Intercom Calls

For some types of IP Centrex arrangements, intercom calls between two IP telephones in the same Centrex Group do not require bandwidth on the IP Access Facility. The packet voice RTP/IP data streams are sent directly between the IP telephones over the Local Area Network. The Simulated Facility Group System can recognize intercom packet voice calls based on the calling and called numbers. The Simulated Facility Group System does not include intercom calls in the Present Simulated Facility Group bandwidth calculation or the GR303 active timeslot calculation.

Alternative Embodiments

Different Concentration Ratios—By adjusting the relative size of the GR303 Simulated Facility Groups with respect to the number of IP telephones in the Centrex Group a service provider can provide different concentrations ratios to different Centrex Customers. For example one customer may want to have no concentration so that they never encounter blocking. Another customer may have low calling rates and may want to save money by having 8:1 concentration. The Simulated Facility Group System can be easily adapted to reflect these choices.

Multiple Traditional Centrex Groups per Digital Loop Carrier—If multiple analog or ISDN Centrex Groups are connected to a single Digital Loop Carrier, the service provider may want to provide different levels of concentration to the different Centrex Groups. The GR303 Simulated Facility Group System can provide these different concentration ratios for these Centrex Groups, using the above described methods and structure.

Summary

The Simulated Facility Group System manages a plurality of IP Centrex Groups within a GR303 interface, where each IP Centrex Group is assigned to a unique Simulated Facility Group. On a per call basis, the Simulated Facility Group System checks the available bandwidth on the IP Centex Access Facility that serves the Centrex Group from which the call originated.

What is claimed:

1. A facility group management system for managing the assignment of bandwidth on shared communication facilities serving a plurality of Centrex Groups, comprising:
   Centrex Group means, responsive to a call origination, for identifying a Centrex Group that serves said call origination;
   bandwidth determining means, responsive to IP Call Type Parameter data received from a Centrex Feature Gateway identifying said call origination, for determining a bandwidth required to serve said call origination; and
   facility determining means for determining whether sufficient bandwidth exists on said identified Centrex Group to serve said call origination.

2. The facility group management system of claim 1 wherein said Centrex Group means comprises:
   table access means, responsive to receipt of data indicative of a calling/called number, for retrieving data from a correspondence table that identifies members of said identified Centrex Group.

3. The facility group management system of claim 1 wherein said facility determining means comprises:
   Facility Group Bandwidth determining means for retrieving data from a memory indicative of present bandwidth usage for said identified Centrex IP Group; and
   capacity determining means for retrieving data from said memory indicative of maximum bandwidth capacity of said identified Centrex IP Group.

4. The facility group management system of claim 3 wherein said capacity determining means comprises:
   summing means for determining a sum comprising adding said determined bandwidth required to serve said call origination to said data indicative of said present bandwidth usage; and
   threshold means for blocking said call origination if said sum exceeds a maximum bandwidth parameter for said identified Centrex IP Group.

5. The facility group management system of claim 3 wherein said capacity determining means comprises:
   summing means for determining a sum comprising adding said determined bandwidth required to serve said call origination to said data indicative of said present bandwidth usage; and
   threshold means for enabling said call origination if said sum fails to exceed a maximum bandwidth parameter for said identified Centrex IP Group.

6. The facility group management system of claim 1 wherein said facility determining means comprises:
   interface means for selecting a GR303 interface to serve said call origination; and
   interface capacity means for determining an availability of timeslots on said selected GR303 facility.

7. The facility group management system of claim 6 wherein said interface capacity means comprises:
   timeslot management means for retrieving data indicative of the number of active timeslots in said selected GR303 interface; and
   threshold means for blocking said call origination if said number of active timeslots in said selected GR303 interface equals a maximum number of timeslots implemented in said selected GR303 interface.

8. The facility group management system of claim 7 wherein said interface capacity means further comprises:
   call termination means for updating said number of active timeslots in said selected GR303 interface in response to termination of an active call served by said selected GR303 interface.

9. The facility group management system of claim 3 further comprising;
   call termination means, responsive to termination of an active call connection, for subtracting said determined bandwidth required to serve said terminated active call connection from said data indicative of said present bandwidth usage.

10. A facility group management method for managing the assignment of bandwidth on shared communication facilities serving a plurality of Centrex Groups, comprising:
    identifying, in response to a call origination, a Centrex Group that serves said call origination;
    determining, in response to IP Call Type Parameter data received from a Centrex Feature Gateway identifying said call origination, a bandwidth required to serve said call origination; and
    determining whether sufficient bandwidth exists on said identified Centrex Group to serve said call origination.

11. The facility group management method of claim 10 wherein said step of identifying comprises:
    retrieving, in response to receipt of data indicative of a calling/called number, data from a correspondence table that identifies members of said identified Centrex Group.

12. The facility group management method of claim 10 wherein said step of determining whether sufficient bandwidth exists comprises:
    retrieving data from a memory indicative of present bandwidth usage for said identified Centrex IP Group; and
    retrieving data from said memory indicative of maximum bandwidth capacity of said identified Centrex IP Group.

13. The facility group management method of claim 12 wherein said step of retrieving data indicative of maximum bandwidth capacity of said identified Centrex IP Group comprises:
    determining a sum comprising adding said determined bandwidth required to serve said call origination to said data indicative of said present bandwidth usage; and
    blocking said call origination if said sum exceeds a maximum bandwidth parameter for said identified Centrex IP Group.

14. The facility group management method of claim 12 wherein said step of retrieving data from said memory indicative of maximum bandwidth capacity of said identified Centrex IP Group comprises:
    determining a sum comprising adding said determined bandwidth required to serve said call origination to said data indicative of said present bandwidth usage; and enabling said call origination if said sum fails to exceed a maximum bandwidth parameter for said identified Centrex IP Group.

15. The facility group management method of claim 10 wherein said step of determining whether sufficient bandwidth exists on said identified Centrex Group to serve said call origination comprises:

selecting a GR303 interface to serve said call origination; and determining an availability of timeslots on said selected GR303 facility.

16. The facility group management method of claim 15 wherein said step of determining an availability of timeslots comprises:

retrieving data indicative of the number of active timeslots in said selected GR303 interface; and blocking said call origination if said number of active timeslots in said selected GR303 interface equals a maximum number of timeslots implemented in said selected GR303 interface.

17. The facility group management method of claim 16 wherein said step of determining an availability of timeslots further comprises:

updating said number of active timeslots in said selected GR303 interface in response to termination of an active call served by said selected GR303 interface.

18. The facility group management method of claim 12 further comprising:

subtracting, in response to termination of an active call connection, said determined bandwidth required to serve said terminated active call connection from said data indicative of said present bandwidth usage.

* * * * *